US012601458B2

(12) United States Patent
Jackl et al.

(10) Patent No.: US 12,601,458 B2
(45) Date of Patent: Apr. 14, 2026

(54) LIGHT FOR A VEHICLE

(71) Applicant: ZKW Group GmbH, Wieselburg (AT)

(72) Inventors: Christian Jackl, Wieselburg (AT); Lars Amundsson, St. Valentin (AT)

(73) Assignee: ZKW Group GmbH, Wieselburg (AT)

(*) Notice: Subject to any disclaimer, the term of this patent is extended or adjusted under 35 U.S.C. 154(b) by 0 days.

(21) Appl. No.: 19/069,609

(22) Filed: Mar. 4, 2025

(65) Prior Publication Data

US 2025/0334245 A1 Oct. 30, 2025

(30) Foreign Application Priority Data

Apr. 26, 2024 (EP) .................................... 24172619

(51) Int. Cl.

| | |
|---|---|
| ***F21S 41/683*** | (2018.01) |
| ***F21S 41/25*** | (2018.01) |
| ***F21S 41/43*** | (2018.01) |
| ***F21S 43/00*** | (2018.01) |
| ***F21S 43/20*** | (2018.01) |
| *F21S 41/153* | (2018.01) |
| *F21S 43/14* | (2018.01) |
| *F21Y 115/10* | (2016.01) |

(52) U.S. Cl.

CPC ............. *F21S 41/683* (2018.01); *F21S 41/25* (2018.01); *F21S 41/43* (2018.01); *F21S 43/26231* (2024.05); *F21S 43/26411* (2024.05); *F21S 43/601* (2024.05); *F21S 41/153* (2018.01); *F21S 43/14* (2018.01); *F21Y 2115/10* (2016.08)

(58) Field of Classification Search

CPC .......... F21S 41/683; F21S 41/25; F21S 41/43; F21S 43/26411; F21S 43/601; F21S 43/153

See application file for complete search history.

(56) References Cited

U.S. PATENT DOCUMENTS

| | | | | |
|---|---|---|---|---|
| 10,551,017 | B2 * | 2/2020 | Jurik | F21S 10/007 |
| 11,982,420 | B2 * | 5/2024 | Okubo | F21S 43/315 |
| 12,111,035 | B2 * | 10/2024 | Hamamoto | B60Q 1/381 |
| 2024/0200746 | A1 * | 6/2024 | Lenicky | G09F 21/04 |

(Continued)

FOREIGN PATENT DOCUMENTS

| | | | |
|---|---|---|---|
| CN | 206682801 | U | 11/2017 |
| CN | 213746568 | U | 7/2021 |

(Continued)

OTHER PUBLICATIONS

Extended European Search Report for International application No. EP24172619.9 , dated Sep. 2, 2024.

*Primary Examiner* — Christopher E Dunay

(74) *Attorney, Agent, or Firm* — Quinn IP Law

(57) ABSTRACT

A lamp (1) for a vehicle, which lamp (1) has an image generator (2), a projection system (3) and an adaptive aperture device (4), wherein the aperture device (4) has a first opening (5) in a first plane (6) and a second opening (7) in a second plane (8) along the beam path, wherein, during operation of the lamp (1), a beam (20) is reduced through the first opening (5) to a first portion of the beam and this first portion is reduced through the second opening (7) to a residual portion of the beam (20), wherein the first opening (5) in the first plane (6) and the second opening (7) in the second plane (8) are displaceable relative to one another.

11 Claims, 3 Drawing Sheets

(56) References Cited

U.S. PATENT DOCUMENTS

| | | | | |
|---|---|---|---|---|
| 2024/0288148 | A1* | 8/2024 | Takeuchi | G02B 27/0018 |
| 2024/0310021 | A1* | 9/2024 | Kitazawa | F21S 43/15 |

FOREIGN PATENT DOCUMENTS

| | | | |
|---|---|---|---|
| DE | 102019202434 | A1 | 8/2019 |
| DE | 102019218776 | A1 | 6/2020 |
| DE | 102020114767 | A1 | 12/2021 |
| DE | 102022133738 | A1 | 11/2023 |
| FR | 3049242 | A1 | 9/2017 |

* cited by examiner

LIGHT FOR A VEHICLE

The invention relates to a lamp for a vehicle, which lamp has an image generator and a projection system, wherein light which is segmented by the image generator during operation of the lamp can be emitted as a beam along a beam path, wherein a beam which is emitted during operation is projected at least partially in front of the lamp via the projection system as a segmented light distribution, wherein an adaptive aperture device is arranged along the beam path, by means of which aperture device the beam is partially shielded during operation, so that a variable residual portion of the beam passes through the aperture device.

A comparable lamp is known, for example, from DE102019118264A1. The invention relates to an illumination device for a motor vehicle. This illumination device is designed in particular as a high-resolution headlight and comprises an aperture diaphragm which has a variable opening width in order to be able to adapt the imaging quality and the illumination intensity to different requirements. An iris diaphragm is proposed as a possible embodiment of the aperture diaphragm. An iris diaphragm is a known embodiment of an aperture diaphragm. Such an iris diaphragm usually comprises a plurality of movable components which permit a change in the opening width by means of a complicated mechanism. However, the practical realization of such an aperture diaphragm, in the embodiment of an iris diaphragm, is associated with high costs.

The object of the invention is therefore to provide a lamp for a vehicle which overcomes at least the aforementioned disadvantage.

The object is achieved with a lamp of the aforementioned type, wherein the aperture device has a first opening along the beam path in a first plane and a second opening in a second plane, wherein during operation the beam is reduced to a first portion of the beam by the first opening and this first portion is reduced to the residual portion of the beam by the second opening, wherein the first opening in the first plane and the second opening in the second plane are displaceable relative to one another.

An "opening" means an opening in relation to light. This means that, at least in the immediate vicinity, no light passes through the plane around the opening in the plane, but light can pass
through the opening itself. As a result, the beam is reduced to a first portion of the beam when it passes through the first plane and thus through the first opening, which first portion is reduced to the residual portion of the beam when it passes through the second plane and thus through the second opening. The first portion of the beam and the remaining portion of the beam can relate to the respective light flux of the beam after the respective plane along the beam path.

By displacing the first opening and the second opening in the respective plane relative to one another, the residual portion of the beam passing through the aperture device can be varied without having to make an effort for complicated mechanics.

It can be provided with advantage that the first opening and the second opening are geometrically similar, preferably geometrically congruent.

In order to simplify the implementation of the adaptive aperture device in the lamp, it can be provided that the first opening is designed symmetrically along a first axis of symmetry and the second opening is designed symmetrically along a second axis of symmetry.

It can be advantageous in this case if the first opening has a first opening center point with a first opening radius and a second opening center point with a second opening radius and the second opening has a third opening center point with a third opening radius and a fourth opening center point with a fourth opening radius, wherein the first opening radius is equal to the third opening radius and the second opening radius is equal to the fourth opening radius, wherein the first opening radius is greater than the second opening radius and wherein the first opening center point and the second opening center point are arranged on the first axis of symmetry and the third opening center point and the fourth opening center point are arranged on the second axis of symmetry.

Advantageously, it can be provided that the projection system comprises at least three optical lenses, preferably five optical lenses, the first plane and the second plane being located in the beam path after the first lens, or preferably between the third lens and the fourth lens.

Advantageously, the first plane and the second plane are oriented parallel to one another.

In order to increase the influence of the adaptive aperture device on the projected segmented light distribution, the first plane and the second plane can be oriented at an angle to one another.

Advantageously, the first opening and the second opening are arranged on a foil, wherein the foil is guided along the first plane and the second plane via at least one deflection roller, wherein the foil is movable via an actuator, with the result that the first opening in the first plane and the second opening in the second plane can be displaced relative to one another simultaneously via the actuator.

In this case, the residual portion of the beam can be varied in a particularly simple manner if the foil is preloaded at a first end by a spring and is connected to the actuator at a second end of the foil opposite the first end.

Alternatively, it can be provided that the foil is closed in itself.

The invention further relates to a motor vehicle equipped with such a lamp.

The invention is illustrated in the following with reference to exemplary and non-limiting figures. In particular:

Figure 3A:
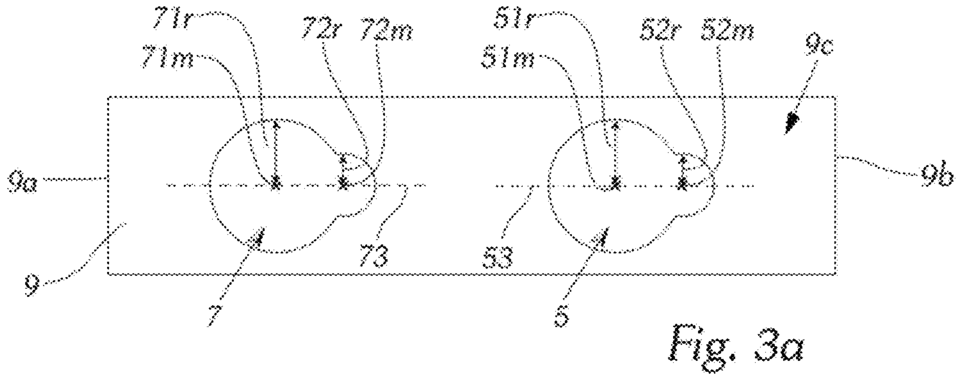
Figure 3B:
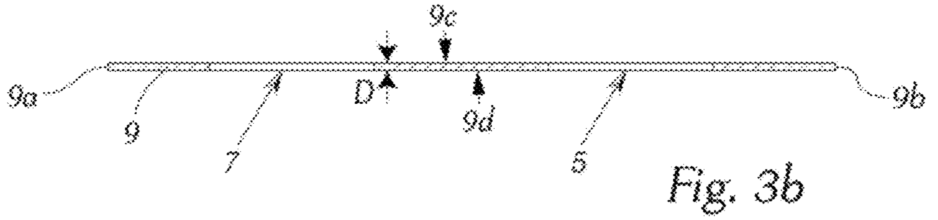
Figure 4A:
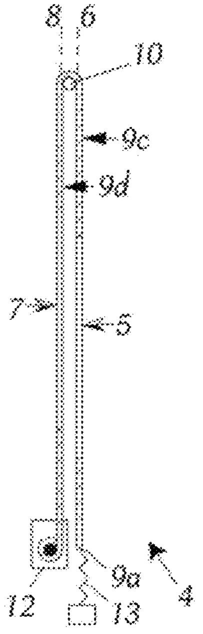
Figure 4B:
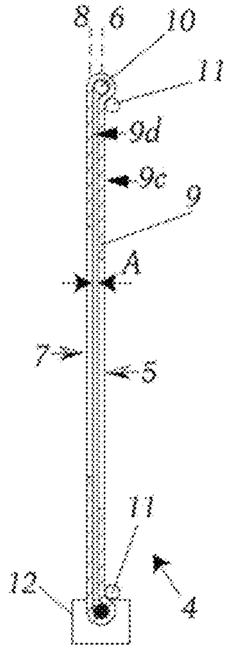
Figure 4C:
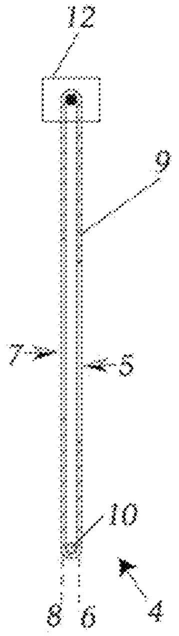
Figure 4D:
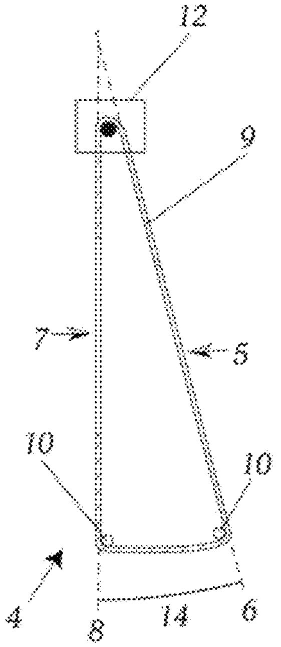
Figure 5A:
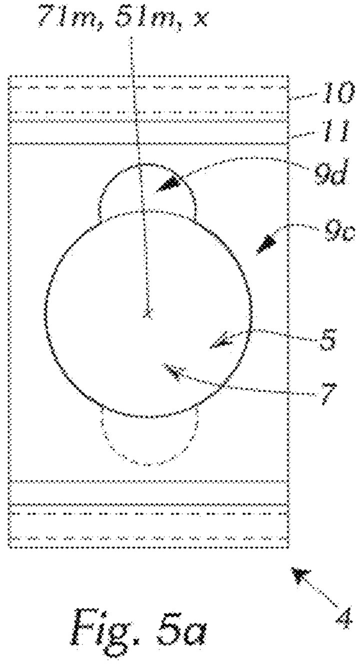
Figure 5B:
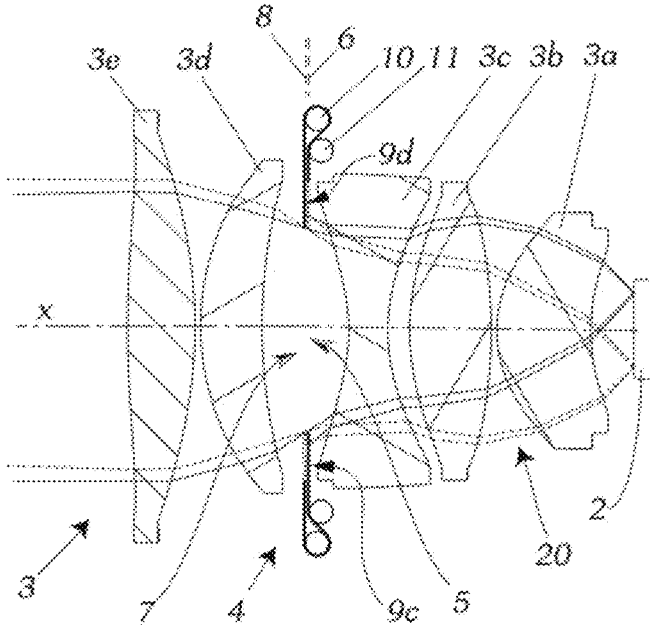
Figure 6A:
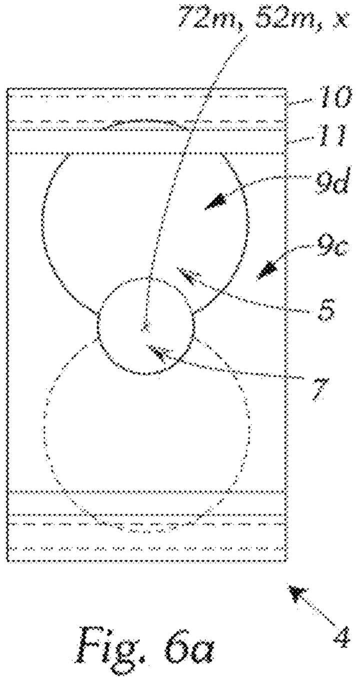
Figure 6B:
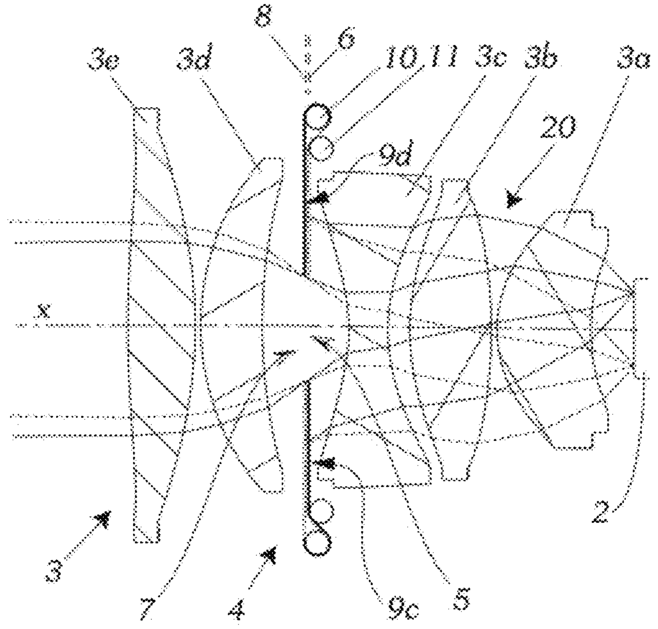

FIG. 3*a* schematically shows a foil with a first opening and a second opening, FIG. 3*b* schematically shows a sectional view through the foil, FIGS. 4*a* to 4*d* show possible embodiments of the adaptive aperture device with a foil, FIGS. 5*a* and 5*b* show a first position of the adaptive aperture device and the resulting residual portion of a beam, and FIGS. 6*a* and 6*b* show a second position of the adaptive aperture device and the resulting residual portion of a beam.

Figure 1:
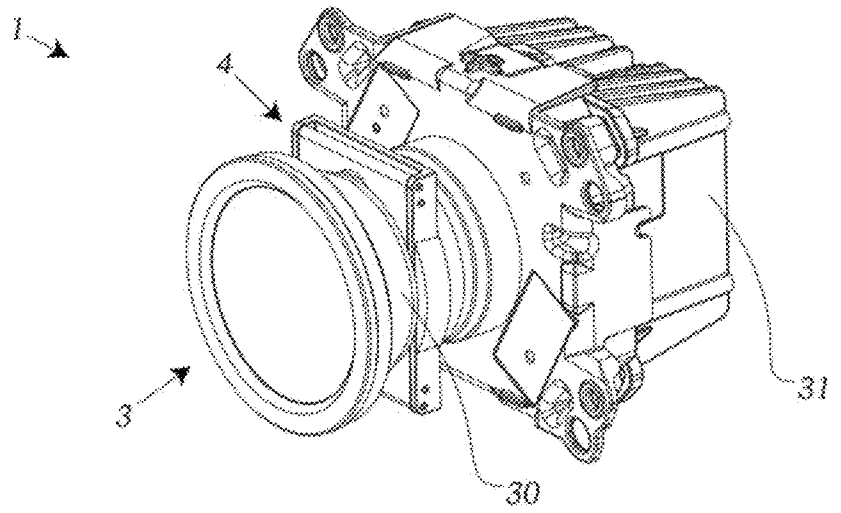
FIG. 1 shows a representation of a lamp.

FIG. 1 shows a lamp 1. This lamp 1 has an image generator 2, shown in FIG. 2, and a projection system 3. The projection system 3 is accommodated in a holder 30, which holder 30 can be connected to a carrier 31. The carrier 31 can be formed as a heat sink. Furthermore, the image generator 2 can be arranged on the carrier 31.

Figure 2:
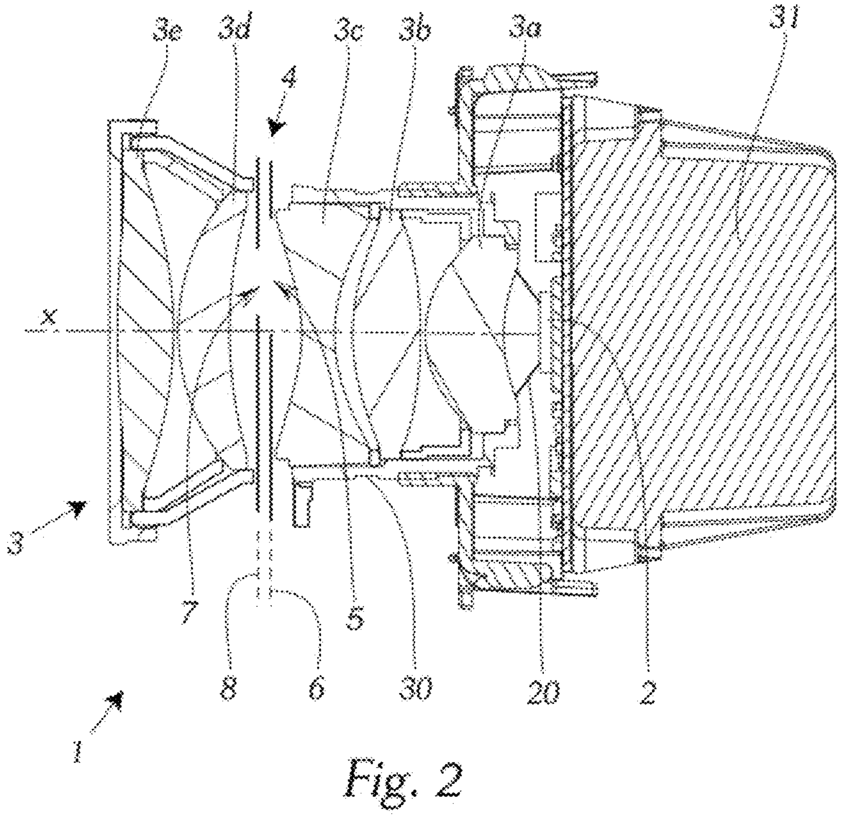
FIG. 2 shows a sectional view of a lamp.

As shown in FIG. 2, light segmented by the image generator 2 is emitted as a beam 20 along a beam path during operation of the lamp 1. The operation of the lamp 1 is thus determined by whether light is emitted by the image generator 2. This means that the lamp 1 is in operation when light is emitted by the image generator 2. The beam path specifies a path with a direction, which path originates from the image generator 2. In the present case, the path coincides with the optical axis X of the projection system 3. The image generator 2 can comprise a matrix with a plurality of LED light sources, which LED light sources can be controlled separately in order to emit segmented light as a beam 20. The matrix can consist of several thousand LED light sources. The image generator 2 can also comprise known alternative modulation techniques, such as an LCD (liquid crystal display) or a DMD (digital mirror device), in order to radiate segmented light as a beam 20.

During operation of the lamp 1, this beam 20 is projected at least partially via the projection system 3 as a segmented light distribution in front of the lamp 1. The projection system 3 can have a plurality of lenses 3*a*, 3*b*, 3*c*, 3*d*, 3*e* and is arranged along the beam path. For example, the projection system 3 has at least three lenses 3*a*, 3*c*, 3*e*. As shown, the projection system 3 preferably has five lenses 3*a*, 3*b*, 3*c*, 3*d*, 3*e*.

The lamp 1 has an adaptive aperture device 4 which is arranged along the beam path and can be accommodated in the holder 30 in the same way as the projection system 3. During operation of the lamp 1, this aperture device 4 shields at least part of the beam 20 emanating from the image generator 2. As a result, a residual portion of the beam 20 passes through the aperture device 4.

The aperture device 4 has a first opening 5 in a first plane 6 and a second opening 7 in a second plane 8 along the beam path. The first plane 6 as well as the second plane 8 are preferably perpendicular to the optical axis X of the projection system 3. Light can pass through the openings 5, 7 during operation. At least in the immediate vicinity around the openings 5, 7 in the respective plane 6, 8, the light is shielded. Thus, during operation of the lamp 1, the beam 20 is reduced to a first portion of the beam 20 as it passes through the first plane and thus through the first opening 5, and this first portion is subsequently reduced to a residual portion of the beam 20 as it passes through the second plane 8 and thus through the second opening 7. Since the first opening 5 in the first plane 6 and the second opening 7 in the second plane 8 are displaceable relative to one another, an adaptive aperture device 4 is provided by means of which the residual portion of the beam 20 can be varied. Details of this are shown in the description of the figures of FIG. 5*b* and FIG. 6*b*. The first portion of the beam and the residual portion of the beam 20 can relate to the respective light flux of the beam 20 after the respective plane 6, 8 along the beam path.

The first plane 6 and the second plane 8 are preferably located, as shown, in the beam path between the third lens 3*c* and the fourth lens 3*d* of the projection system 3.

The first opening 5 and the second opening 7 can be arranged on plates which are movable with respect to one another and absorb light. These plates are then correspondingly arranged in the first plane 6 or in the second plane 8. Preferably, however, the first opening 5 and the second opening 7 are arranged on a foil 9.

The first opening 5 and the second opening 7 can be geometrically similar and are preferably geometrically congruent, as shown in FIG. 3*a*.

The first opening 5 can be designed symmetrically along a first axis of symmetry 53 and the second opening 7 can be designed symmetrically along a second axis of symmetry 73.

The first opening 5 and/or the second opening 7 can have oval shapes. Likewise, elliptical or other not completely circular shapes are possible.

The first opening 5 and the second opening 6 are preferably formed as shown in FIG. 3*a*. The first opening 5 has a first opening center point 51*m* with a first opening radius 51*r* and a second opening center point 52*m* with a second opening radius 52*r*. In addition, the second opening 7 has a third opening center point 71*m* with a third opening radius 71*r*, and a fourth opening center point 72*m* with a fourth opening radius 72*r*. The first opening radius 51*r* is equal to the third opening radius 71*r* and the second opening radius 52*r* is equal to the fourth opening radius 72*r*, the first opening radius 51*r* being greater than the second opening radius 52*r*, and the first opening center point 51*m* and the second opening center point 52*m* being arranged on the first axis of symmetry 53 and the third opening center point 71*m* and the fourth opening center point 72*m* being arranged on the second axis of symmetry 73.

As shown in FIG. 3*a*, the openings 5, 7 can be arranged on a common foil 9. This foil 9 has a first end 9*a* and a second end 9*b* opposite the first end 9*a*. The first opening 5 and the second opening 7 are arranged between the first end 9*a* and the second end 9*b* of the foil 9. As shown in FIG. 3*b*, the foil 9 has a certain thickness D between a first foil side 9*c* and a second foil side 9*d* opposite the first foil side 9*c*. This thickness D can be 0.2 mm.

The foil 9 preferably has a temperature resistance of between minus 40° C. and plus 95° C. Furthermore, the foil 9 is preferably formed from a substantially completely light-absorbing material. The foil 9 can be formed as a composite foil with fabric fibers, for example textile fibers, in order to meet a certain tear strength.

FIGS. 4*a* to 4*d* show sectional views of different embodiments of the adaptive aperture device 4 with a foil 9, the remaining elements of the lamp 1 not being shown for the sake of clarity. In the embodiments shown, the foil 9 can be moved via an actuator 12, with which the first opening 5 in the first plane 6 and the second opening 7 in the second plane 8 can be displaced relative to one another simultaneously via the actuator 12.

FIG. 4*a* shows a first possible embodiment of the aperture device 4 with a foil 9. The foil 9 is guided over a deflection roller 10 along the first plane 6 and the second plane 8, as a result of which the second foil side 9*d* is partially opposite itself. At the first end 9*a*, the foil 9 is preloaded by a spring 13, and at the second end 9*b*, the foil 9 is connected to the actuator 12.

FIG. 4*b* shows a second possible embodiment of the aperture device 4 with a foil 9. In this embodiment, the aperture device 4 also has a deflection roller 10 and an actuator 12. In this embodiment, the foil 9 is closed on itself. As already in the embodiment according to FIG. 4*a*, the second foil side 9*d* faces itself in sections. Furthermore, two tensioning rollers 11 are shown which permit a defined distance A between the second foil side 9*d* facing itself. This distance A can be between 0.1 mm and 10 mm, preferably between 0.1 mm and 2 mm.

FIG. 4*c* shows a third possible embodiment of the aperture device 4 with a foil 9, wherein no tensioning rollers 11 are provided.

In the embodiments according to FIGS. 4*a* to 4*c*, the first plane 6 and the second plane 8 are oriented parallel to one another. Accordingly, the foil 9 is also correspondingly guided, so that the first opening 5 in the first plane 6 and the second opening 7 in the second plane 8 can be displaced. The first plane 6 as well as the second plane 8 can be oriented perpendicularly to the optical axis X of the projection system 3 (cf. FIG. 2, FIG. 5*b* and FIG. 6*b*).

It may be expedient to align the first plane 6 and the second plane 8 at an angle 14 to one another. Such an embodiment is shown in FIG. 4*d*, in which two deflection rollers 10 are provided. FIG. 4*d* thus shows a fourth embodiment of the aperture device 4 with a foil 9. Through the two deflection rollers 10, the foil 9 and thus the first opening 5 are guided along the first plane 6 and the second opening 7 along the second plane 8, wherein the first planes 6 and the second plane 8 are oriented at an angle 14 to one another. The angle 14 can be, for example, between 0.1° and 45°. With respect to the orientation relative to the optical axis X of the projection system 3, the first plane 6 or the second plane 8 can be aligned perpendicular to this optical axis X.

FIG. 5*a* shows a top view of the aperture device 4 in its third embodiment from the perspective of the image generator 2, the geometries of the first opening 5 and of the second opening 7 being formed in accordance with the embodiment shown in FIG. 3*a*. The aperture device 4 is in a first position. In this first position, the first opening center point 51*m* and the third opening center point 71*m* coincide with the optical axis X of the projection system 3.

FIG. 5*b* shows the reduction of the beam 20 resulting from the first position of the aperture device 4. A beam 20 extends from the image generator 2 along a beam path, which beam 20 passes through the first lens 3*a*, the second lens 3*b* and the third lens 3*d* of the projection system 3. The aperture device 4 is arranged between the third lens 3*c* and the fourth lens 3*d* of the projection system 3. The first opening 5 of the aperture device 4 is arranged in a first plane 6 and the second opening 7 of the aperture device 4 is arranged in a second plane 8. Part of the beam 20 impinges on the first foil side 9*c* of foil 9 and is thereby shielded. Thus, the beam 20 is reduced to a first portion of the beam 20 as it passes through the first plane 6 and thus through the first opening 5. This first portion of the beam 20 continues along the beam path and partially impinges on the second foil side 9*d*. As a result, the first portion of the beam 20 which exists between the first plane 6 and the second plane 8 is reduced to a residual portion of the beam 20 when it passes through the second plane 8 and thus through the second opening 7. The residual portion of the beam 20 thus exists in the direction of the beam path after the second plane 8 and passes through the fourth lens 3*d* and the fifth lens 3*e*. Thus the beam 20 emitted during operation is projected in reduced form via the projection system 3 as a segmented light distribution in front of the lamp 1.

FIG. 6*a* shows the aperture device 4 in a second position from the point of view of the image generator 2. The transition from the first position to the second position or the simultaneous relative displacement of the first opening 5 in the first plane 6 and of the second opening 7 in the second plane 8 relative to one another can be effected by the actuator 12 already described (compare FIGS. 4*a* to 4*d*). In this second position, the second opening center point 52*m* and the fourth opening center point 72*m* coincide with the optical axis X of the projection system 3. Analogously to the first position of the aperture device 4, the beam 20 is now first reduced to a first portion and this first portion is subsequently reduced to a residual portion of the beam 20. The residual portion of the beam 20 resulting from the second position of the aperture device 4 is less than the residual portion of the beam 20 resulting from the first position of the aperture device 4. The remaining portion of the beam 20 can be visually varied by the adaptive aperture device 4.

Although only two positions of the aperture device 4 are shown, any number of positions are conceivable. In combination with geometrically differently shaped openings 5, 7 and a corresponding alignment of the planes 6, 8 relative to one another, an adaptive aperture device 4 can be created which can be adapted to further requirements. The invention is therefore not limited to the embodiments shown, but is defined by the entire scope of protection of the claims. Individual aspects of the invention or of the embodiments can also be taken up and combined with one another. Any reference numerals in the claims are exemplary and serve only for the easier readability of the claims without restricting them.

The invention claimed is:

1. A motor vehicle with a lamp (1), which lamp (1) has an image generator (2) and a projection system (3), wherein segmented light can be emitted by the image generator (2) during operation of the lamp (1) as a beam (20) along a beam path, wherein a beam (20) emitted during operation is projected at least partially via the projection system (3) as a segmented light distribution in front of the lamp (1), wherein an adaptive aperture device (4) is arranged along the beam path, by means of which aperture device (4) the beam (20) is partially shielded during operation, so that a variable residual portion of the beam (20) passes through the aperture device (4), characterized in that the aperture device (4) has a first opening (5) in a first plane (6) and a second opening (7) in a second plane (8) along the beam path, wherein, during operation, the beam (20) is reduced to a first portion of the beam (20) by the first opening (5) and this first portion is reduced to the residual portion of the beam (20) by the second opening (7), wherein the first opening (5) in the first plane (6) and the second opening (7) in the second plane (8) are displaceable relative to one another, wherein the first opening (5) has a first opening center point (51*m*) with a first opening radius (51*r*) and a second opening center point (52*m*) with a second opening radius (52*r*) and the second opening (7) has a third opening center point (71*m*) with a third opening radius (71*r*) and a fourth opening center point (72*m*) with a fourth opening radius (72*r*), wherein the first opening radius (51*r*) is equal to the third opening radius (71*r*) and the second opening radius (52*r*) is equal to the fourth opening radius (72*r*), wherein the first opening radius (51*r*) is greater than the second opening radius (52*r*) and wherein the first opening center point (51*m*) and the second opening center point (52*m*) are arranged on the first axis of symmetry and the third opening center point (71*m*) and the fourth opening center point (72*m*) are arranged on the second axis of symmetry.

2. A motor vehicle with a lamp (1), which lamp (1) has an image generator (2) and a projection system (3), wherein segmented light can be emitted by the image generator (2) during operation of the lamp (1) as a beam (20) along a beam path, wherein a beam (20) emitted during operation is projected at least partially via the projection system (3) as a segmented light distribution in front of the lamp (1), wherein an adaptive aperture device (4) is arranged along the beam path, by means of which aperture device (4) the beam (20) is partially shielded during operation, so that a variable residual portion of the beam (20) passes through the aperture device (4), characterized in that the aperture device (4) has a first opening (5) in a first plane (6) and a second opening (7) in a second plane (8) along the beam path, wherein, during operation, the beam (20) is reduced to a first portion of the beam (20) by the first opening (5) and this first portion is reduced to the residual portion of the beam (20) by the second opening (7), wherein the first opening (5) in the first plane (6) and the second opening (7) in the second plane (8) are displaceable relative to one another, wherein the first opening (5) and the second opening (7) are arranged on a foil (9) and the foil (9) is guided along the first plane (6) and the second plane (8) via at least one deflection roller (10), wherein the foil (9) is movable via an actuator (12), whereby the first opening (5) in the first plane (6) and the second opening (7) in the second plane (8) can be displaced relative to one another simultaneously via the actuator (12).

3. The motor vehicle according to claim 2, wherein the first opening (5) and second opening (7) are geometrically similar.

4. The motor vehicle according to claim 2, wherein the first opening (5) is designed symmetrically along a first axis of symmetry (53) and the second opening (7) is designed symmetrically along a second axis of symmetry (73).

5. The motor vehicle according to claim 2, wherein the projection system (3) comprises at least three optical lenses (3*a*, 3*c*, 3*e*), and wherein the first plane (6) and the second plane (8) are located in the beam path after the first lens.

6. The motor vehicle according to claim 2, wherein the first plane (6) and the second plane (8) are oriented parallel to each other.

7. The lamp (1) motor vehicle according to claim 2, wherein the first plane (6) and the second plane (8) are oriented at a non-zero angle (14) to one another.

8. The motor vehicle according to claim 2, wherein the foil (9) is preloaded at a first end (9*a*) by a spring (13) and is connected to the actuator (12) at a second end (9*b*) of the foil (9) opposite the first end (9*a*).

9. The motor vehicle according to claim 2, wherein the foil (9) is closed in itself.

10. The motor vehicle according to claim 2, wherein the projection system (3) comprises five optical lenses (3*a*, 3*b*, 3*c*, 3*d*, 3*e*), and wherein the first plane (6) and the second plane (8) are located in the beam path between the third lens (3*c*) and the fourth lens (3*d*).

11. The motor vehicle according to claim 2, wherein the first opening (5) and second opening (7) are geometrically congruent.

* * * * *